US008543526B2

(12) United States Patent
Moore

(10) Patent No.: US 8,543,526 B2
(45) Date of Patent: Sep. 24, 2013

(54) SYSTEMS AND METHODS USING NEURAL NETWORKS TO REDUCE NOISE IN AUDIO SIGNALS

(75) Inventor: Douglas A. Moore, San Diego, CA (US)

(73) Assignee: The Intellisis Corporation, San Diego, CA (US)

(\*) Notice: Subject to any disclaimer, the term of this patent is extended or adjusted under 35 U.S.C. 154(b) by 362 days.

(21) Appl. No.: 12/883,313

(22) Filed: Sep. 16, 2010

(65) Prior Publication Data

US 2011/0270790 A1  Nov. 3, 2011

Related U.S. Application Data

(60) Provisional application No. 61/330,036, filed on Apr. 30, 2010.

(51) Int. Cl.
*G06F 15/00* (2006.01)
*G06F 17/00* (2006.01)
*G06N 3/10* (2006.01)

(52) U.S. Cl.
USPC .......................................................... 706/44

(58) Field of Classification Search
None
See application file for complete search history.

(56) References Cited

U.S. PATENT DOCUMENTS 5,285,522 A * 2/1994 Mueller ......................... 704/232

OTHER PUBLICATIONS

Autoreceptor http://en.wikipedia.org/wiki/Autoreceptor, 2009.*

\* cited by examiner

*Primary Examiner* — Li-Wu Chang
(74) *Attorney, Agent, or Firm* — Pillsbury Winthrop Shaw Pittman LLP

(57) ABSTRACT

Systems, methods, and computer program products are provided to provide noise reduction for an input signal using a neural network. A feed-forward set of neuron groups is provided to enhance neuron activity within a particular frequency band based on prior reception of activity within that frequency band, and also to attenuate surrounding frequency bands. A surround-inhibition set of neuron groups further attenuates activity surrounding the stimulated frequency band.

21 Claims, 6 Drawing Sheets

SYSTEMS AND METHODS USING NEURAL NETWORKS TO REDUCE NOISE IN AUDIO SIGNALS

CROSS-REFERENCE TO RELATED APPLICATION

The present application claims the benefit of U.S. Provisional Application No. 61/330,036, filed Apr. 30, 2010, entitled "Noise Cleanup", which is incorporated herein by reference in its entirety.

BACKGROUND OF INVENTION

1. Field of the Invention

The present invention relates generally to neural networks and, more specifically, to using neuron groups to inhibit noise in an audio signal.

2. Description of the Background Art

A common problem that developers of signal processing applications face is the need for effective noise reduction algorithms. Modem approaches to noise reduction primarily use a time-frequency (e.g., spectrogram) approach, where an audio signal is decomposed into frequency bands. By identifying frequencies associated with noise, the frequency components of the noise can be removed from the signal.

However, most of these approaches tend to damage the signal as well, and may also miss stray noises that are not pronounced with enough significance for the noise reduction algorithms to detect them. As a result, the quality of the signal may be degraded, without removing all of the noise components.

Accordingly, what is desired is a noise cleanup mechanism that can enhance desired signal components and eliminate non-signal components.

SUMMARY OF INVENTION

Embodiments of the invention include a system comprising a filter configured to create a feature vector from an input signal, a feed-forward set of neuron groups configured to enhance activity within a stimulated frequency band and attenuate activity surrounding the stimulated frequency band, and a surround-inhibition set of neuron groups configured to further attenuate activity surrounding the stimulated frequency band.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
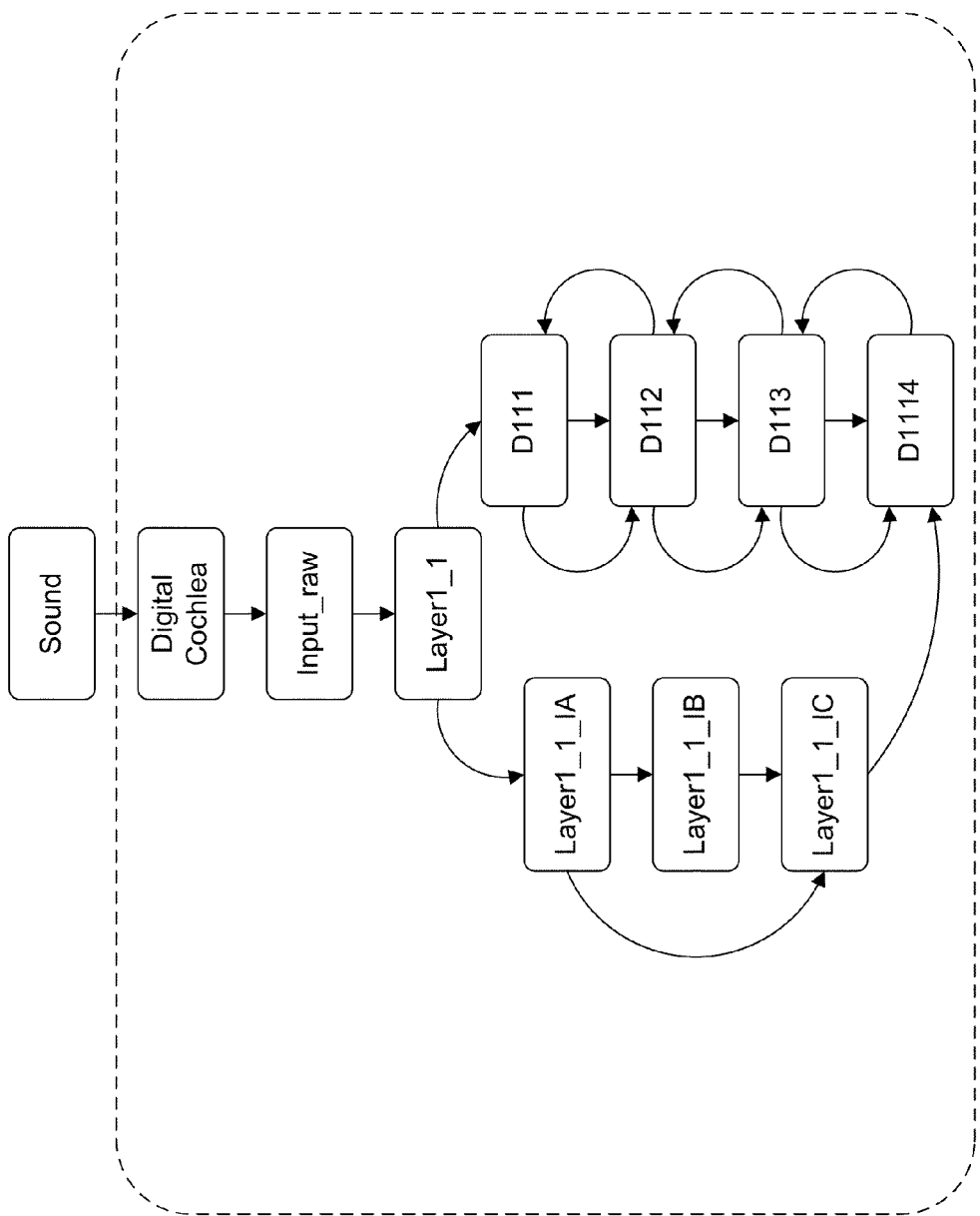
FIG. 1 illustrates a noise cleanup component of a brain-based device, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

As used herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Further, it would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

FIG. 1 illustrates a noise cleanup component 100 of an apparatus such as, but not limited to, a brain-based device ("BBD"), in accordance with an embodiment of the present invention. Noise cleanup component 100 receives an input sound 102 to be denoised, in accordance with an embodiment of the present invention. Input sound 102 is processed by digital cochlea 104, which separates the input sound 102 into individual components corresponding to the instantaneous energy response of input sound 102 at various frequencies, in accordance with an embodiment of the present invention. By way of example, and not limitation, a set of filters, arranged in a filter bank, each obtain energy response readings for input sound 102 for a time slice for each filter's corresponding frequency response range. One skilled in the relevant arts will recognize that the precise mechanism for breaking down input sound 102 into its frequency components may vary, and the filter bank mechanism is provided by way of example, and not limitation. Additionally, although implementation details are described herein in the context of input sound 102, the actual input 102 may be any other source, including, by way of example, and not limitation, visual data.

Additional implementation details for a non-limiting exemplary embodiment of digital cochlea 104 are provided in co-pending, commonly-owned U.S. Provisional Patent Application No. 61/330,042, entitled "Audio Filter Bank Design", filed Apr. 30, 2010, which is incorporated in its entirety herein. The term "digital cochlea" is used to identify the behavior of such a filter bank as mimicking the auditory portion of the human inner ear, although this precise configuration is provided by way of example, and not limitation. One skilled in the relevant arts will recognize that the filters can be arranged to emphasize a number of different frequency response ranges based on desired characteristics.

The output of digital cochlea 104 is in the form of raw input 106, in accordance with an embodiment of the present invention. Raw input 106 is, in accordance with a further embodiment of the present invention, a feature vector comprising individual bins each indicating the instantaneous energy response at its corresponding frequency range. Additionally, digital cochlea 104 may itself provide some noise reduction capabilities in an attempt to improve the quality of raw input 106. One skilled in the relevant arts will appreciate that any number of noise reduction modules may be present prior (or subsequent) to noise cleanup component 100, including the use of no noise reduction modules, and the use of digital cochlea 104 as a noise reduction module is presented by way of example, and not limitation.

II. Block Signal Enhancement and Surround Noise Inhibition

In accordance with an embodiment of the present invention, neurons in a neural network in a BBD are structured in groups, with each neuron in a first group connected to one or more neurons in a second group. These connections are represented by a projection from the first group to the second group. Additional implementation details for a non-limiting exemplary BBD are provided in co-pending, commonly-owned U.S. Provisional Patent Application No. 61/329,919, entitled "Neural Network for Clustering Input Data Based on a Gaussian Mixture Model", filed Apr. 30, 2010, which is incorporated in its entirety herein.

Figure 2:
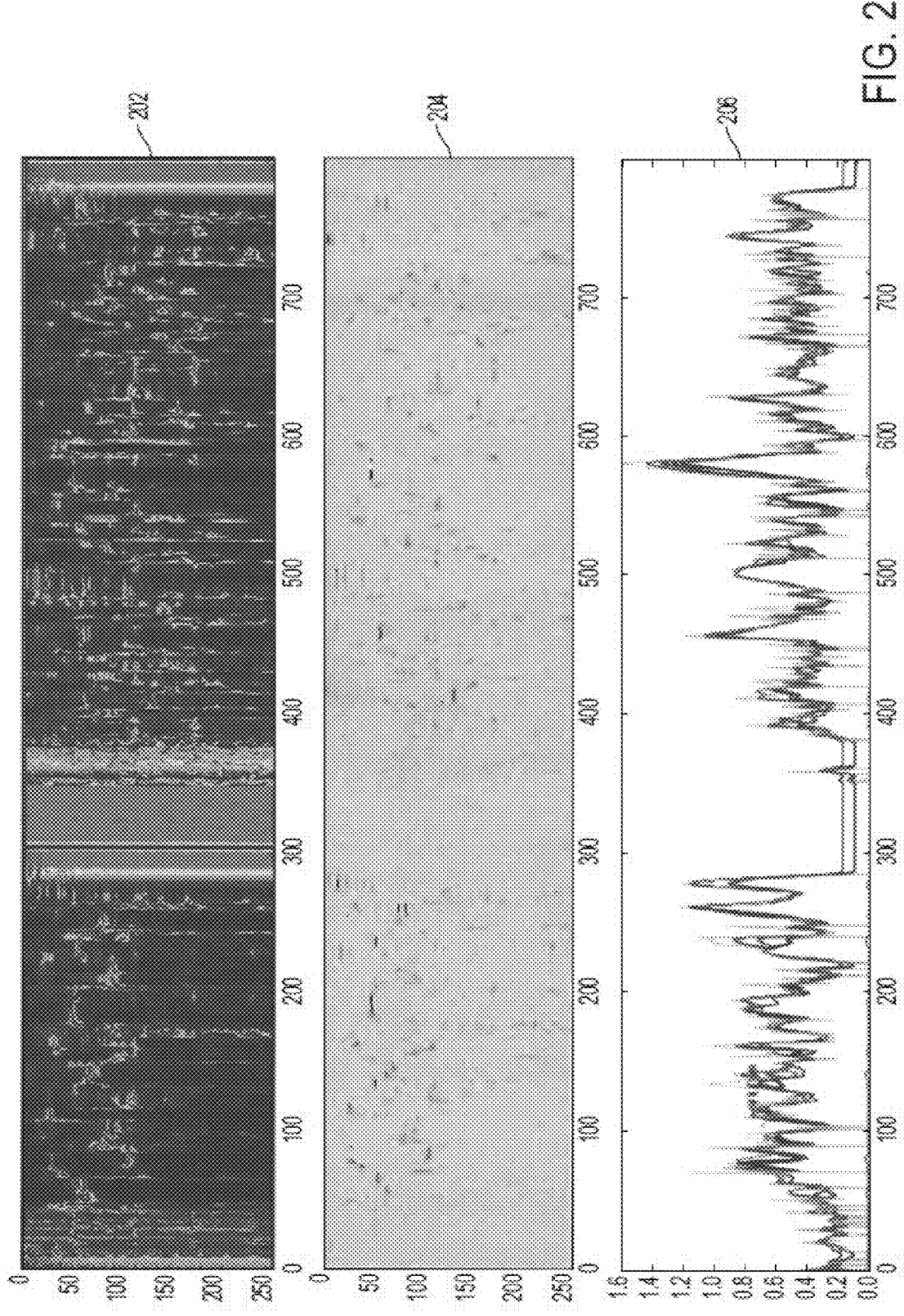
FIG. 2 illustrates an example noisy input signal and its corresponding noise-reduced outputs, in accordance with an embodiment of the present invention.

The aforementioned raw input 106, for example in the form of a feature vector of input sound 102 for a given time-slice, can be processed to isolate desired signal components from noise components. FIG. 2 illustrates an example noisy input signal 202 and its corresponding noise-reduced outputs 204 and 206, in accordance with an embodiment of the present invention. As can be seen in input signal 202, corresponding to raw input 106, a signal is present across a number of frequency bins from 0 to 250 over a time scale shown on the horizontal axis. At several instances in input signal 202, such as around time 300, solid vertical bars appear, indicating sudden noises with frequency components across the spectrum. Additionally, several noises appear as short blips on the illustration of input signal 202, such as the small horizontal blips at around 200 time units. These are noises occurring at a fixed frequency (e.g., noise from a background fan running at a constant speed), although the ones shown in input signal 202 have a limited duration. One skilled in the relevant arts will appreciate that the precise signal and noise characteristics of input signal 202 will vary with the application, and the characteristics of input signal 202 shown are presented by way of example, and not limitation.

In accordance with an embodiment of the present invention, each of the neurons in the aforementioned groups corresponds to a particular frequency range. In accordance with a further embodiment of the present invention, Layer1_1 input group has a number of neurons corresponding to a number of bins in digital cochlea 104. Specifically, in an embodiment, and as noted above, a filter bank of digital cochlea 104 can be designed so that each filter of the filter bank provides a corresponding frequency response that, taken together with the rest of the filter bank, provides an overall frequency response that closely mimics that of the human cochlea. Each of the filters of this filter bank would therefore correspond to a neuron of the Layer 1_1 input group.

Raw input 106 would therefore, in accordance with an embodiment of the present invention, be represented as a feature vector with a number of scalar values each corresponding to the individual bins from digital cochlea 104, each bin associated with the instantaneous energy output in a corresponding frequency range. For example, a bin of digital cochlea 104 associated with the frequency range $f_o$ through $f_i$ would respond to frequencies of raw input 106 within that range.

Figure 3:
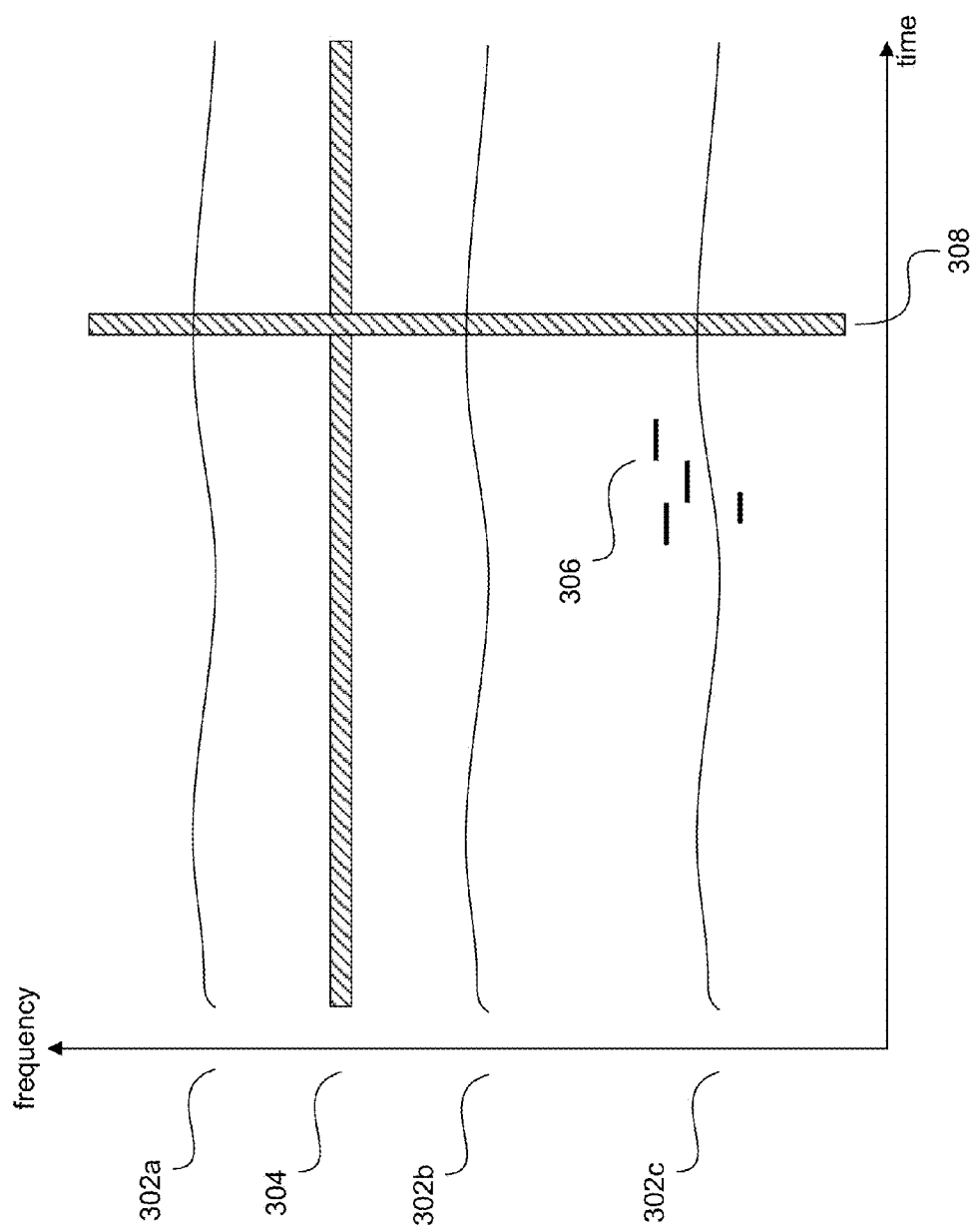
FIG. 3 is a time-frequency diagram corresponding to an exemplary raw audio input, in accordance with an embodiment of the present invention.

FIG. 3 is a time-frequency diagram 300 corresponding to an exemplary raw audio input, in accordance with an embodiment of the present invention. In a non-limiting exemplary embodiment, the audio input has three signal components 302a, 302b, and 302c, occurring at different frequencies. Each of these signal components may excite an energy response from one or more filter bins in digital cochlea 104 corresponding to a frequency range in which each of the signal components 302 occurs.

Accordingly, each of a number of neurons in a group, such as group Layer1_1 108 of FIG. 1, has as an input a corresponding instant energy response for a frequency range. Additionally, a number of neurons would see, in the non-limiting example depicted in FIG. 3, noise originating from frequencies associated with fixed-frequency noise 304. Noise 304 is, in accordance with a non-limiting exemplary embodiment, a noise that occurs for a long time duration but is confined to a relatively small frequency range, such as the earlier example of a fan spinning at a constant speed.

Noise 306 is of a short duration and of varying frequencies, and may be scattered throughout the time-frequency diagram 300. Noise 306, in the particular example form shown in FIG. 3, is located around signal component 302c, and is termed "transient noise". In the illustrated example, noise 308 is associated with a short duration and a large frequency response range, such as a sudden air burst into a microphone, which steps on the information from signals 302.

These noises, among other noise characteristics, can be reduced or eliminated by applying excitatory or inhibitory connections according to the response seen by each neuron, in accordance with an embodiment of the present invention.

Neuron groups 110 receive the feature vector from Layer1_1 108 beginning at group D111. Group D111 has a "block_u" connection to group D112, which in turn has a "block_u" connection to group D113, which also in turn has a "block_u" connection to group D114, in accordance with an embodiment of the present invention. These "block_u" connections are excitatory connections, serving to enhance signal identified at a particular neuron at a first group, such as group D111, at a next corresponding neuron of a second group, such as group D112.

Figure 4:
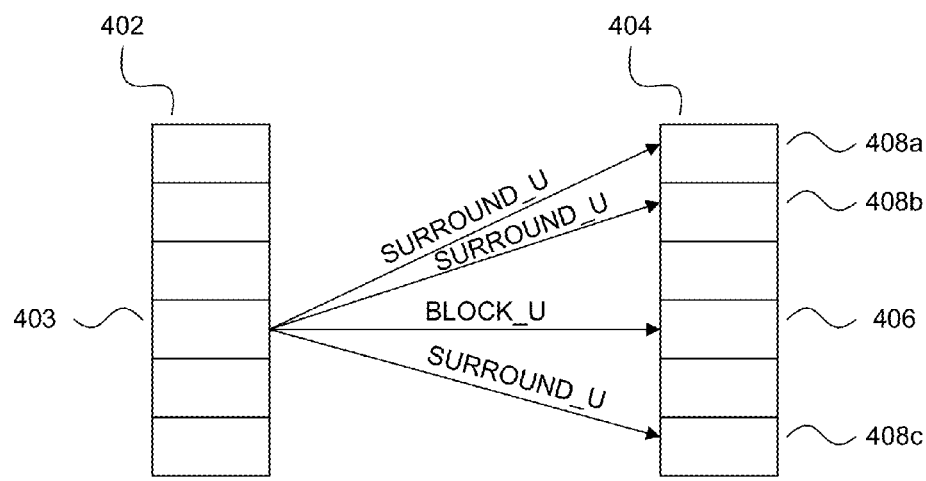
FIG. 4 is an example neural group connection diagram illustrating inhibitory and excitatory connections between a first group and a second group, in accordance with an embodiment of the present invention.

FIG. 4 is an example neural group connection diagram 400 illustrating inhibitory and excitatory connections between a first group 402 and a second group 404, in accordance with an embodiment of the present invention. A first group 402 is comprised of a number of neurons, such as neuron 403. Neuron 403, having a strong signal component as its input, provides a strong excitatory input to corresponding neuron 406 of group 404 using a block_u connection, in accordance with an embodiment of the present invention. As a result, any signal received by group 404 at the frequency range corresponding to neuron 406 is enhanced. In the case of FIG. 3, for example, signal 302a would be enhanced such that it becomes stronger relative to any background noise, particularly noise of a short temporal nature such as noise 308.

Each of the groups in neuron groups 110 also have a "surround_u" connection to the next group in the sequence, in accordance with an embodiment of the present invention. These "surround_u" connections are made between each neuron in a first group, such as group 402 of FIG. 4 (or, for example, group D111 of FIG. 1), and neurons in a second group, such as group 404 of FIG. 4 (or, for example, group D112 of FIG. 1) which are outside of a specified radius, in accordance with an embodiment of the present invention.

In the non-limiting exemplary embodiment shown in neural group connection diagram 400, a radius of "2" has been selected, which causes neuron 403 to inhibit, based on its own activity, the activity of neurons 408a, 408b, and 408c of group 404, due to their presence outside of a radius of "2" (e.g., two or more neurons away from neuron 406, which is the neuron corresponding directly to neuron 403 of group 402). This inhibition attenuates the outputs of neurons 408, causing their own subsequent inhibitory or excitatory effects to be attenuated. In accordance with a further embodiment of the present invention, a maximum radius is also provided, limiting the range of the inhibiting connections.

The aforementioned block_u and surround_u connections are applied among a number of groups, in accordance with an embodiment of the present invention. As shown in FIG. 1, four groups each work to emphasize or attenuate neuron activity based on the block_u and surround_u connections from the previous node.

In accordance with a further embodiment of the present invention, the activity for a given neuron is provided by:

$$Activity_{New} = Activity_{old} * Persistence + Activity_{New} * (1 - Persistence)$$

The persistence operates as an auto-recursive filter within the neuron, that allows for adjustment of each neuron's attack rate and decay rate. One skilled in the relevant arts will recognize that adjustment of this persistence value, if utilized, is application-dependent, and its utilization as described herein is provided by way of example, and not limitation.

This persistence is useful in eliminating transient noise 306, which prevents a strong response from accumulating at neuron groups 110. Specifically, a neuron receiving activity from noise 306, such as neuron 403, which then excites neuron 406, may be forced to provide an attenuated excitatory response (or none at all) over the block_u connection if configured to have a lengthy attack rate based on its persistence.

Additionally, transient noise 306 is eliminated by inhibitory surround_u connections from a neuron, such as neuron 403, centered around signal 302c, in accordance with an embodiment of the present invention. By way of example, and not limitation, transient noise 306 is present at neurons 408a, 408b, and 408c. However, the inhibitory surround_u connection from neuron 403, strengthened by its own high activity from signal 302c (and perhaps further enhanced by previous excitatory block_u connections from a prior group), inhibits the activity of neurons 408a to pass transient noise 306.

Likewise, noise 304 is inhibited, using surround_u connections, by the neurons associated with signals 302a and 302b. In the case of noise 308, all of the neurons of a first group, such as group 402, will end up inhibiting all of the neurons of a second group, such as group 404, effectively clamping the entire frequency range, and thereby eliminating noise 308.

One skilled in the relevant arts will appreciate that neuron groups 110 can be implemented using any number of feed-forward algorithms, and the precise configuration of neuron groups 110 is presented by way of example, and not limitation.

III. Voltage-Dependent Feedback

In accordance with an embodiment of the present invention, each group of neuron groups 110 has a voltage-dependent feedback to the prior group. Voltage-dependent connections are influential only when an activity at a destination neuron is above a certain threshold, in accordance with an embodiment of the present invention.

These voltage-dependent connections are in the form of block_u connections, in accordance with an embodiment of the present invention. As a result, areas that correspond to known-good signals, such as signals 302a, 302b, and 302c, excite corresponding neurons in the prior group.

On each compute cycle, outputs are provided along each of the connections shown in FIG. 1, in accordance with an embodiment of the present invention. In real-time operation, a first time-slice of speech signal 302a, by way of example and not limitation, would appear at group D111. It would then be pushed, at each subsequent clock cycle, through groups D112, D113, and D114, respectively, as feature vectors corresponding to subsequent time-slices are pushed into the earlier neuron groups.

As a result, in real-time processing, the earlier time-slices of a signal help improve the processing of subsequent time-slices by enhancing signal components (i.e., subsequent signals occurring at a same frequency as signal 302a), and attenuating surrounding noise.

Figure 5:
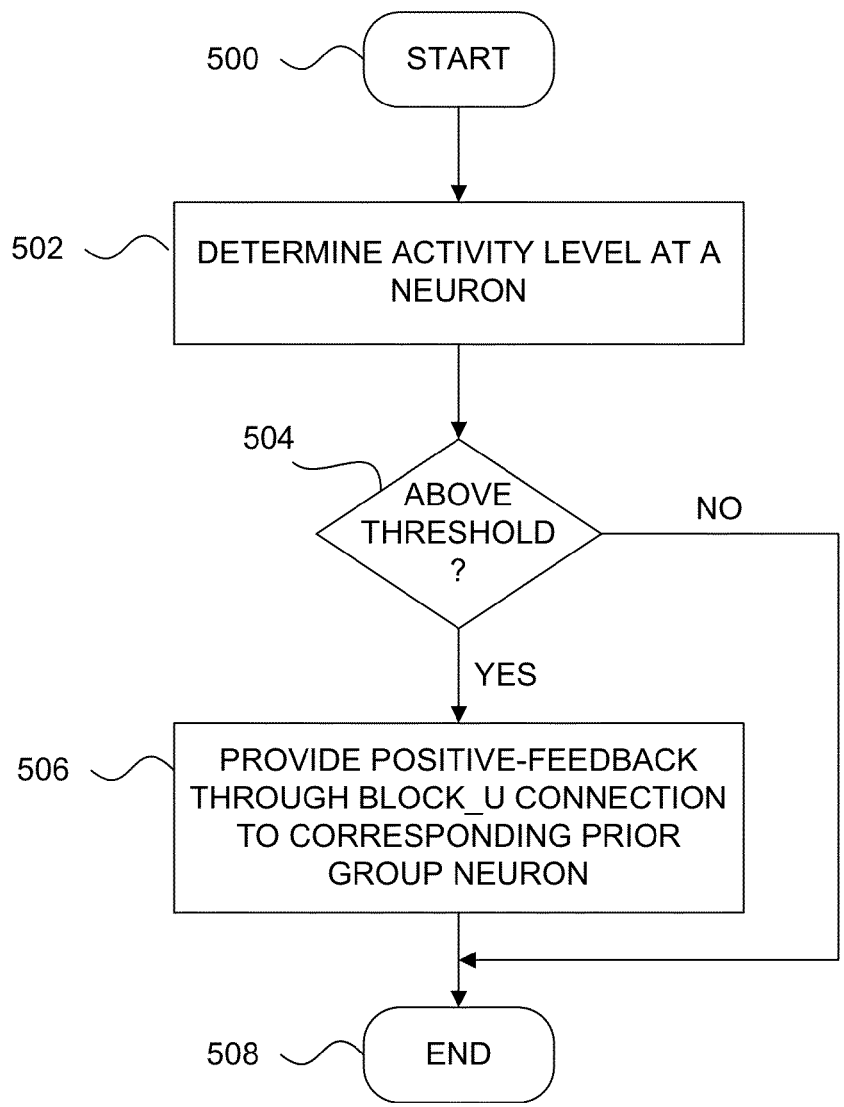
FIG. 5 is a flowchart illustrating a positive-feedback loop, in accordance with an embodiment of the present invention

FIG. 5 is a flowchart 500 illustrating a positive-feedback loop, in accordance with an embodiment of the present invention. The method begins at step 502 and proceeds to step 504 where an activity level is determined for a particular neuron, in accordance with an embodiment of the present invention. This activity level includes, by way of example and not limitation, a corresponding voltage reading for the neuron. At step 506, it is then determined whether this activity level is above a certain threshold.

If the activity level is above a certain threshold, then positive-feedback is provided at step 508 to a corresponding prior group neuron, in accordance with an embodiment of the present invention. This would allow high activity levels found at a neuron at, for example, group D113, to enhance a corresponding neuron at group D112. As a result, the corresponding neuron at group D112 would enhance the likely corresponding subsequent time-slice from group D112 of a signal present at the earlier time-slice in group D113.

The method then ends at step 510. If the activity level is not above a certain threshold, then the method also ends without providing an enhancing positive-feedback effect to a prior neuron.

IV. Enhanced Surround Noise Inhibition

In accordance with an embodiment of the present invention, additional inhibition of surrounding noise is provided by neuron groups 112, in accordance with an embodiment of the present invention. Neuron groups 112 are, in accordance with an embodiment of the present invention, of a same depth as groups 110, such that the output from group D113 is ready at the same computational cycle as the output from Layer1_1_IC for use by group D114.

In neuron groups 112, a surround_u connection is provided from Layer1_1 108 to Layer1_1_IA. This captures activity around a surrounding set of neurons, such as neurons 408 of group 404. A block_u connection between group Layer1_1_IA to Layer1_1_IB passes the activity in the surround set of neurons. However, in accordance with an embodiment of the present invention, this block_u connection is associated with a high persistence level, as given by the aforementioned activity formula. As a result, activity in neurons of group Layer1_1_IB takes a relatively longer time to build up compared to other neurons.

A block_u connection from group Layer1_1_IB to Layer1_1_IC passes this built-up surrounding noise information. However, in accordance with an embodiment of the present invention, this connection is voltage-dependent, requiring a voltage-independent block_u connection from group Layer1_1_IA to group Layer1_1_IC to be present above sufficient activity, meeting the voltage-dependency threshold, for the persistence contribution of Layer1_1_IB to influence Layer1_1_IC. This voltage dependent inclusion prevents persistent activity in Layer1_1_IB to inhibit inappropriate data.

The output of group Layer1_1_IC is then used to inhibit, via a block_u connection, the neurons of group D114, thereby further sharpening signal response.

V. Example Computer System Implementation

Figure 6:
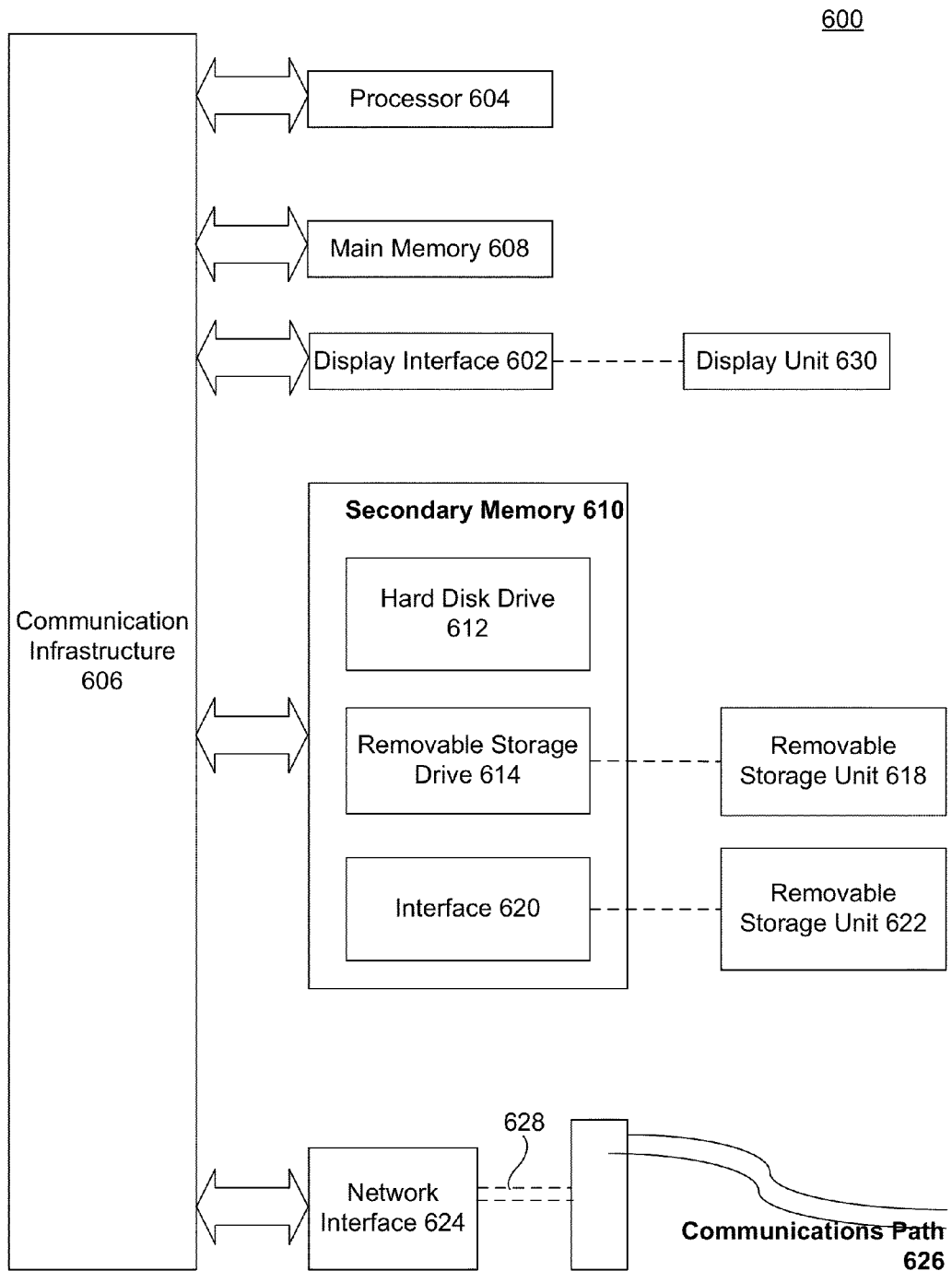
FIG. 6 depicts an example computer system in which embodiments of the present invention may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the methods illustrated by noise cleanup component 100 of FIG. 1 and flowchart 500 of FIG. 5 can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. that is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 that allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals that may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the methods illustrated by noise cleanup component 100 of FIG. 1 and flowchart 500 of FIG. 5, discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A system comprising:
 a physical processor; and
 physical storage media,
 the physical processor and physical storage media being configured to implement:
  a filter configured to create a feature vector from an input signal, wherein elements of the feature vector correspond to individual frequency bands of the input signal, wherein one or more individual elements of the feature vector correspond to adjacent individual frequency bands of the input signal;
  a feed-forward set of neuron groups implemented using the physical processor and physical storage media, wherein the feed-forward set of neuron groups is configured to enhance activity within a stimulated frequency band and attenuate activity surrounding the stimulated frequency band, wherein the stimulated frequency band corresponds to a particular element of the feature vector, wherein a radius of individual frequency bands are adjacent to the stimulated frequency band, and wherein the individual frequency bands that are outside of the radius of individual frequency bands are attenuated, wherein the feed-forward set of neuron groups comprise a first and second neuron group, the first neuron group feeding into the second neuron group, wherein the feed-forward set of neuron groups operate on subsequent time-slices of the input signal, wherein the first neuron group operates on a first time slice, and wherein the second neuron group operates on a second time slice; and
  a surround-inhibition set of neuron groups configured to further attenuate activity surrounding the stimulated frequency band.

2. The system of claim 1, wherein elements of the feature vector correspond to individual neurons of neuron groups, and wherein the radius of individual frequency bands is at least 2.

3. The system of claim 1, wherein the feed-forward set of neuron groups includes a particular number of neuron groups configured to connect in a feed-forward manner to another neuron group in the feed-forward set of neuron groups, and wherein the surround-inhibition set of neuron groups includes a number of neuron groups equal to the particular number of neurons groups in the feed-forward set of neuron groups.

4. The system of claim 1, wherein neurons of the first neuron group provide an excitatory input to corresponding neurons of the second neuron group to enhance the activity within the stimulated frequency band.

5. The system of claim 1, wherein neurons of the first neuron group provide an attenuating input to neurons of the second neuron group surrounding corresponding neurons of the second neuron group to attenuate activity surrounding the stimulated frequency band.

6. The system of claim 1, wherein neurons of the second neuron group provide a positive-feedback loop to corresponding neurons of the first neuron group such that, based on activity in the second neuron group for the second time slice, activity in the first neuron group for the first time slice is enhanced, and wherein the first time slice is subsequent to the second time slice.

7. The system of claim 6, wherein the positive-feedback loop is active responsive to neurons of the second neuron group having an activity level above a threshold.

8. A computer-implemented method, the method being implemented in a computer system that includes a physical processor and physical storage media, the method comprising:
 creating a feature vector from an input signal, wherein elements of the feature vector correspond to individual frequency bands of the input signal, wherein one or more individual elements of the feature vector correspond to adjacent individual frequency bands of the input signal;
 enhancing activity within a stimulated frequency band and attenuating activity surrounding the stimulated frequency band within a feed-forward set of neuron groups, wherein the stimulated frequency band corresponds to a particular element of the feature vector, wherein a radius of individual attenuated frequency bands are adjacent to the stimulated frequency band, and wherein the individual frequency bands that are outside of the radius of frequency bands are attenuated; and
 further attenuating activity surrounding the stimulated frequency band within a surround-inhibition set of neuron groups,
 wherein the feed-forward set of neuron groups comprise a first and second neuron group, the first neuron group feeding into the second neuron group, the feed-forward set of neuron groups operating on subsequent time-slices of the input signal, the first neuron group operating on a first time slice, and the second neuron group operating on a second time slice.

9. The method of claim 8, further comprising:
 mapping elements of the feature vector to individual neurons of neuron groups.

10. The method of claim 8, wherein the feed-forward set of neuron groups includes a particular number of neuron groups connecting in a feed-forward manner to another neuron group in the feed-forward set of neuron groups, and wherein the surround-inhibition set of neuron groups includes a number of neuron groups equal to the particular number of neurons groups in the feed-forward set of neuron groups.

11. The method of claim 8, further comprising:
 providing an excitatory input from neurons of the first neuron group to corresponding neurons of the second neuron group to enhance the activity within the stimulated frequency band.

12. The method of claim 8, further comprising:
 providing an attenuating input from neurons of the first neuron group to neurons of the second neuron group surrounding corresponding neurons of the second neuron group to attenuate activity surrounding the stimulated frequency band.

13. The method of claim 8, further comprising:
providing a positive-feedback loop from neurons of the second neuron group to corresponding neurons of the first neuron group such that, based on activity in the second neuron group for the second time slice, activity in the first neuron group for the first time slice is enhanced, and wherein the first time slice is subsequent to the second time slice.

14. The method of claim 13, wherein providing the positive-feedback loop comprises providing the positive-feedback loop responsive to neurons of the second neuron group having an activity level above a threshold.

15. A non-transitory computer-readable storage medium having stored thereon computer-executable instructions that, when executed by a computing device, cause the computing device to perform a method comprising:
creating a feature vector from an input signal, wherein elements of the feature vector correspond to individual frequency bands of the input signal, wherein one or more individual elements of the feature vector correspond to adjacent individual frequency bands of the input signal;
enhancing activity within a stimulated frequency band and attenuating activity surrounding the stimulated frequency band within a feed-forward set of neuron groups, wherein the stimulated frequency band corresponds to a particular element of the feature vector, wherein a radius of individual attenuated frequency bands are adjacent to the stimulated frequency band, and wherein the individual frequency bands that are outside of the radius of frequency bands are attenuated; and
further attenuating activity surrounding the stimulated frequency band within a surround-inhibition set of neuron groups,
wherein the feed-forward set of neuron groups comprise a first and second neuron group, the first neuron group feeding into the second neuron group, the feed-forward set of neuron groups operating on subsequent time-slices of the input signal, the first neuron group operating on a first time slice, and the second neuron group operating on a second time slice.

16. The computer-readable medium of claim 15 the method further comprising:
mapping elements of the feature vector to individual neurons of neuron groups.

17. The computer-readable medium of claim 15, wherein the feed-forward set of neuron groups includes a particular number of neuron groups connecting in a feed-forward manner to another neuron group in the feed-forward set of neuron groups, and wherein the surround-inhibition set of neuron groups includes a number of neuron groups equal to the particular number of neurons groups in the feed-forward set of neuron groups.

18. The computer-readable medium of claim 15, the method further comprising:
providing an excitatory input from neurons of the first neuron group to corresponding neurons of the second neuron group to enhance the activity within the stimulated frequency band.

19. The computer-readable medium of claim 15, the method further comprising:
providing an attenuating input from neurons of the first neuron group to neurons of the second neuron group surrounding corresponding neurons of the second neuron group to attenuate activity surrounding the stimulated frequency band.

20. The computer-readable medium of claim 15, the method further comprising:
providing a positive-feedback loop from neurons of the second neuron group to corresponding neurons of the first neuron group such that, based on activity in the second neuron group for the second time slice, activity in the first neuron group for the first time slice is enhanced, and wherein the first time slice is subsequent to the second time slice.

21. The computer-readable medium of claim 20, wherein providing the positive feedback loop comprises providing the positive-feedback loop responsive to neurons of the second neuron group having an activity level above a threshold.

* * * * *